United States Patent
Hoxmeier

(10) Patent No.: US 6,235,863 B1
(45) Date of Patent: May 22, 2001

(54) PRODUCTION OF SATURATED SILOXANE POLYMERS FROM AROMATIC MONOMERS

(75) Inventor: Ronald James Hoxmeier, Houston, TX (US)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 09/441,759

(22) Filed: Nov. 17, 1999

Related U.S. Application Data

(60) Provisional application No. 60/110,796, filed on Dec. 3, 1998.

(51) Int. Cl.$^7$ ...................................................... C08G 77/08
(52) U.S. Cl. ............................... 528/15; 528/16; 528/33; 528/43; 528/14; 525/106; 556/462
(58) Field of Search .............................. 556/462; 528/25, 528/15, 14, 16, 43, 33; 525/106

(56) References Cited

U.S. PATENT DOCUMENTS

| 4,956,484 | * | 9/1990 | Gementi et al. | 556/410 |
| 4,977,291 | * | 12/1990 | Gementi et al. | 556/466 |
| 4,997,898 | | 3/1991 | Ishihara et al. | 526/308 |
| 5,670,688 | * | 9/1997 | Dinh et al. | 556/453 |

* cited by examiner

*Primary Examiner*—Margaret G. Moore
(74) *Attorney, Agent, or Firm*—Donald F. Haas

(57) ABSTRACT

A method for producing a saturated siloxane polymer is provided. In one aspect, the method comprises hydrogenating an aromatic siloxane monomer by contacting it with hydrogen in a temperature of 100° C. to 200° C. and a hydrogen pressure of 1000 to 2000 psi for 1 to 6 hours in the presence of a hydrogenation catalyst to produce a hydrogenated siloxane monomer, and anionically polymerizing the hydrogenated siloxane monomer.

17 Claims, No Drawings

PRODUCTION OF SATURATED SILOXANE POLYMERS FROM AROMATIC MONOMERS

This application claims the benefit of U.S. Provisional Application No. 60/110,796, filed Dec. 3, 1998, the entire disclosure of which is hereby incorporated by reference

FIELD OF THE INVENTION

This invention relates to the production of saturated siloxane polymers which are made from aromatic siloxane monomers and/or other aromatic monomers. More particularly, this invention relates to the hydrogenation of aromatic siloxane monomers and to the hydrogenation of aromatic polysiloxane copolymers.

BACKGROUND OF THE INVENTION

Linear block copolymers of polystyrene and polydimethylsiloxane have been synthesized, both by graft and block copolymerization. In block copolymerization of such linear polymers, polystyrene (PS) is produced by anionic polymerization with an organo lithium initiator and the living polymer (PS-Li+) created thereby is reacted with hexamethylcyclotrisiloxane, $(Me_2SiO)_3$, in the presence of a polar promoter wherein a block of polydimethylsiloxane (PDMS) grows on the end of the living vinyl aromatic hydrocarbon polymer block.

Typically, saturated versions of unsaturated polymers are obtained by hydrogenation of the product polymer. This often leads to slow kinetics, high viscosities, polymer degradation, etc. It would be highly advantageous to have a method for producing saturated versions of unsaturated polymers which do not require the hydrogenation of the product polymer itself. In one embodiment of the present invention, such a method is provided.

Hydrogenation of aromatic components of polymers is known to be difficult. In fact, in the case of block copolymers of polystyrenes and polydienes, it is well known that the polydienes can be almost completely hydrogenated without affecting the polystyrene significantly. Polystyrene/polysiloxane block copolymers are known, including polysiloxane blocks which contain aromatic functionality. Saturated versions of such polymers cannot be made by conventional polymerization techniques. The present invention provides a method for producing saturated polymers from these polysiloxane copolymers.

SUMMARY OF THE INVENTION

In one embodiment, the present invention provides a method of producing a saturated siloxane copolymer which comprises:

(a) hydrogenating an aromatic siloxane monomer by contacting it with hydrogen in a temperature of 100° C. to 200° C. and a hydrogen pressure of 1000 to 2000 psi for 1 to 6 hours in the presence of a hydrogenation catalyst, preferably a nickel carboxylate/aluminum trialkyl catalyst having an aluminum:nickel ratio of 1:1 to 5:1; and (b) anionically polymerizing the hydrogenated monomer and, optionally, a non-aromatic siloxane monomer; and (c) optionally, anionically polymerizing at least one other anionically polymerizable monomer into the saturated siloxane copolymer.

In the second embodiment of the present invention, a method is provided for producing a saturated siloxane polymer which comprises:

(a) optionally, anionically polymerizing at least one anionically polymerizable monomer to form a polymer block; and (b) anionically polymerizing an aromatic siloxane monomer and, optionally, a non-aromatic siloxane monomer, on the end of the optional polymer block of (a); and (c) hydrogenating the siloxane polymer by contacting it with hydrogen at a temperature of 100° C. to 200° C. and a hydrogen pressure of 1000 to 2000 psi for 1 to 6 hours in the presence of a hydrogenation catalyst, preferably a nickel carboxylate/aluminum trialkyl catalyst having an aluminum:nickel ratio of 1:1 to 5:1.

DETAILED DESCRIPTION OF THE INVENTION

Polysiloxane block copolymers and methods of making them are fully described in U.S. Pat. No. 5,281,666, which is herein incorporated by reference. In block copolymerization of linear polystyrene-polydimethylsiloxane polymers, for example, polystyrene is produced by anionic polymerization with an organo lithium initiator and the living polymer (PS-Li+) created thereby is reacted with hexamethylcyclotrisiloxane, in the presence of a polar promoter wherein a block of polydimethylsiloxane grows on the end of the living vinyl aromatic hydrocarbon polymer block. The aromatic siloxane monomers of this invention are copolymerized into the siloxane block in the same manner as are their hydrogenated analogues. It is best to polymerize blocks other than the polysiloxane blocks before the polysiloxane blocks because the crossover from polysiloxane to other polymer blocks is usually kinetically challenged.

The polymers produced according to this invention are based, at least in part, on aromatic cyclic siloxane monomers. In one embodiment, the aromatic monomers are hydrogenated prior to polymerization and in the other, after polymerization. They may form homopolymers or block copolymers with other anionically polymerizable monomers such as ethylene and styrene. When they are used to form polymers or polymer blocks, they may be copolymerized with non-aromatic cyclic siloxane monomers to form random copolymers or random copolymer blocks. The cyclic siloxane monomers useful herein include those with the formula $(R_1R_2SiO)_n$, where n=3–10, $R_1$ and $R_2$=alkyl $(C_1–C_{20})$, alkenyl $(C_2–C_{20})$, hydrogen, benzyl or phenyl (including alkyl substituted aromatics and polycyclics) and $R_1$ and $R_2$ can be the same or different. In accordance with one of the preferred embodiments hereof, an aromatic siloxane monomer is first hydrogenated as described below and then polymerized. Specific siloxane monomers include $(Me_2SiO)_3$, $(MeHSiO)_3$, $(Me_2SiO)_4$, $(Me_2SiO)_5$, $(MeHSiO)_4$, $(MeHSiO)_5$, $(Ph_2SiO)_3$, $(Ph_2SiO)_4$, $(Ph_2SiO)_5$, $(PhHSiO)_4$, $(PhHSiO)_5$, $(PhHSiO)_3$, $(vinylmethylSiO)_4$, $(vinylmethylSiO)_5$, $(vinylHSiO)_3$, $(vinylHSiO)_4$, $(vinylHSiO)_5$, $(vinylmethylSiO)_3$, $(PhMeSiO)_3$, $(PhMeSi)_4$, $(PhMeSiO)_5$. Mixtures of aromatic and non-aromatic monomers can also be used to form the polysiloxane blocks to be hydrogenated. Random copolymer blocks could have, for example, the following formula:

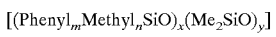

$[(Phenyl_mMethyl_nSiO)_x(Me_2SiO)_y]$ where m=1 or 2 and n=0 or 1. x and y are 1 up to a large number depending upon the desired molecular weight. If styrene is used as a comonomer, then the siloxane polymer will contain a polystyrene block. When the aromatic siloxane block is hydrogenated, the polystyrene block will also be hydrogenated, forming a block of polyvinylcyclohexane.

In general, when solution anionic techniques are used, polymers of anionically polymerizable monomers are prepared by contacting the monomer to be polymerized simultaneously or sequentially with an anionic polymerization initiator such as Group IA metals, their alkyls, amides, silanolates, naphthalides, biphenyls and anthracenyl derivatives. It is preferable to use an organo alkali metal (such as sodium or potassium) compound in a suitable solvent at a temperature within the range from −150° C. to 300° C. preferably at a temperature within the range from 0° C. to 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to 20 carbon atoms; and n is an integer of 1–4.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, diethyl ether, tetrahydrofuran and the like.

If it is desired to include a polyethylene block in the polymer, ethylene may be polymerized as described above with the addition that it is usually best to include a promoter, such as a diamine, to facilitate the reaction. This is described in detail in U.S. Pat. No. 5,618,903, which is herein incorporated by reference.

When the polymerization of the ethylene or other monomer such as styrene is complete, living polymer blocks are present in the polymerization mixture. These are perfectly linear polyethylene-alkyllithiums or polystyrene-alkyllithiums, etc. These living polymers can then be reacted with above-described cyclic siloxane monomers.

This polymerization of the siloxane monomers is carried out in the presence of a polar promoter, including, but not limited to, the promoter present during the ethylene polymerization step. Additional promoter can be added. Such promoters include but are not limited to diethers and/or diamines, such as diethylglyme and\or TMEDA, cyclic ethers such as tetrahydrofuran, and any promoter known to be useful in anionic polymerizations. Its purpose is to decrease the reaction time of the D3 polymerization. Preferably, this reaction is carried out at a temperature of from 30° C. to 150° C., the concentration of the cyclic siloxane monomer is from 1 to 80 percent by weight, and the amount of promoter used ranges from 100 ppm to essentially 100 percent by weight (i.e. the polar promoter is used as solvent). The temperature range is important because higher temperatures cause more rapid reaction. The promoter concentration range is important for the same reason. The reaction may be carried out at up to 80 weight percent solids, preferably 10 to 80 percent. This is advantageous because higher solids offer economic advantages because less solvent is necessary.

The living block copolymer can be recovered directly to give X-siloxane block-Li (where X is a block of polystyrene, polyisoprene, polyethylene, etc. or blocks of two or more or it may be no block at all if the siloxane monomer is aromatic) which is a living polymer and has not been terminated. One could manufacture and sell the living polymer itself to others that could then react it to form other polymers and/or add other functionalities. Termination of the polymer may be achieved by several conventional means.

The block copolymers of this invention have an overall number average molecular weight of from 1000 to 250,000, preferably from 1000 to 100,000. If they contain polystyrene, the number average molecular weights of the polystyrene blocks vary from 1000 to 50,000, preferably 1000 to 30,000. The polyethylene blocks, if present, have number average molecular weights of from 400 to 15,000, and most preferably from 400 to 10,000. The number average molecular weights of the polysiloxane blocks vary from 500 to 250,000, preferably 1000 to 100,000.

These monomers and polymers are hydrogenated by subjecting them to hydrogen at 100 to 200° C., preferably 125 to 175° C., most preferably 140 to 170° C., and a hydrogen pressure of 1000 to 2000 psi for 1 to 6 hours, preferably 1 to 4 hours, in the presence of a hydrogenation catalyst, preferably a nickel or cobalt carboxylate, preferably octanoate, aluminum trialkyl, preferably triethyl, catalyst having Al:Ni or Co ratio of 1:1 to 5:1. Hydrogenation catalysts which can be used are described in U.S. Pat. No. Re 27,145, 3,415,759, 4,970,254, and 5,057,582, which are herein incorporated by reference.

The siloxane polymers of this invention are useful as extruder processing aids with polyolefins, especially polyethylene, engineering thermoplastics such as nylon, e.g., and styrenic block copolymers such as KRATON® thermoplastic elastomers. They are also useful in coatings for low surface energy applications since their low MW and low viscosity allows for efficient melt diffusion to the surface.

EXAMPLES

Example 1
(Hydrogenation of a PS-PDMS Block Copolymer)

To a 1 liter autoclave, a 20 wt % solution in cyclohexane PS-PDMS polymer (14,000–16,000 molecular weight; 30% coupled) was charged. Sufficient hydrogenation catalyst was charged to give a Ni concentration of 1500 ppm Ni. The reactor was pressured to 1900 psi $H_2$ and the temperature was raised to 155° C. After 2.5 hours, hydrogen consumption had ceased. The autoclave contents were recovered and the product was recovered by coagulation with isopropanol.

By NMR, 86% of the polystyrene units had been hydrogenated to polyvinylcyclohexane. The product had a Tg of 122° C. versus about 100° C. for polystyrene. Thus it can be expected to be useful at higher service temperatures and to have superior UV resistance because styrene blocks absorb UV radiation.

Example 2
(Hydrogenation of a Cyclic Aromatic Siloxane Monomer)

This hydrogenation was conducted under the same conditions as described in Example 1. The aromatic siloxane monomer was octaphenylcyclotetrasiloxane ($P_4$). NMR analysis indicated 99% conversion of the phenyl groups to cyclohexyl groups. Product melting point was determined to be 250° C. versus a melting point of 200° C. for $P_4$. Polymers derived from these monomers can be expected to be more processable than those derived from $P_4$ while maintaining superior high temperature properties and should have superior UV resistance compared to $P_4$ analogues.

I claim:

1. A method for producing a saturated siloxane polymer, comprising:
   (a) hydrogenating an aromatic siloxane monomer by contacting it with hydrogen at a temperature of 100 to 200° C. and a hydrogen pressure of 1000 to 2000 psi for 1 to 6 hours in the presence of a hydrogenation catalyst to produce a hydrogenated siloxane monomer; and
   (b) anionically polymerizing the hydrogenated siloxane monomer.

2. The method of claim 1 wherein the hydrogenation catalyst is a nickel carboxylate aluminum trialkyl catalyst.

3. The method of claim 1, further comprising anionically polymerizing the hydrogenated siloxane monomer with a non-aromatic siloxane monomer to form a siloxane copolymer.

4. The method of claim 3, further comprising anionically polymerizing the siloxane copolymer with ethylene.

5. The method of claim 3, further comprising anionically polymerizing the siloxane copolymer with styrene.

6. The method of claim 3, further comprising anionically polymerizing the siloxane copolymer with isoprene.

7. The method of claim 3, wherein the siloxane copolymer is a random or block copolymer.

8. A method for producing a saturated siloxane polymer, comprising:
   (a) hydrogenating an aromatic siloxane monomer to produce a hydrogenated siloxane monomer; and
   (b) anionically polymerizing the hydrogenated siloxane monomer.

9. The method of claim 8, wherein hydrogenating comprises contacting the aromatic siloxane monomer with hydrogen in the presence of a hydrogenation catalyst for about 1 to about 6 hours.

10. The method of claim 8, wherein the hydrogenating occurs at a temperature from about 100° C. to about 200° C.

11. The method of claim 8, wherein the hydrogenating occurs at a pressure of about 1,000 psi to about 2,000 psi.

12. The method of claim 9, wherein the hydrogenation catalyst is a nickel carboxylate aluminum trialkyl catalyst.

13. The method of claim 8, further comprising anionically polymerizing the hydrogenated siloxane monomer with a non-aromatic cyclic siloxane monomer to form a polysiloxane copolymer.

14. The method of claim 8, further comprising anionically polymerizing the polysiloxane copolymer with ethylene.

15. The method of claim 8, further comprising anionically polymerizing the polysiloxane copolymer with styrene.

16. The method of claim 8, further comprising anionically polymerizing the polysiloxane copolymer with isoprene.

17. The method of claim 8, wherein the polysiloxane copolymer is a random or block copolymer.

* * * * *